L. DURSSE.
Percolators.
No. 150,307.
Patented April 28, 1874.
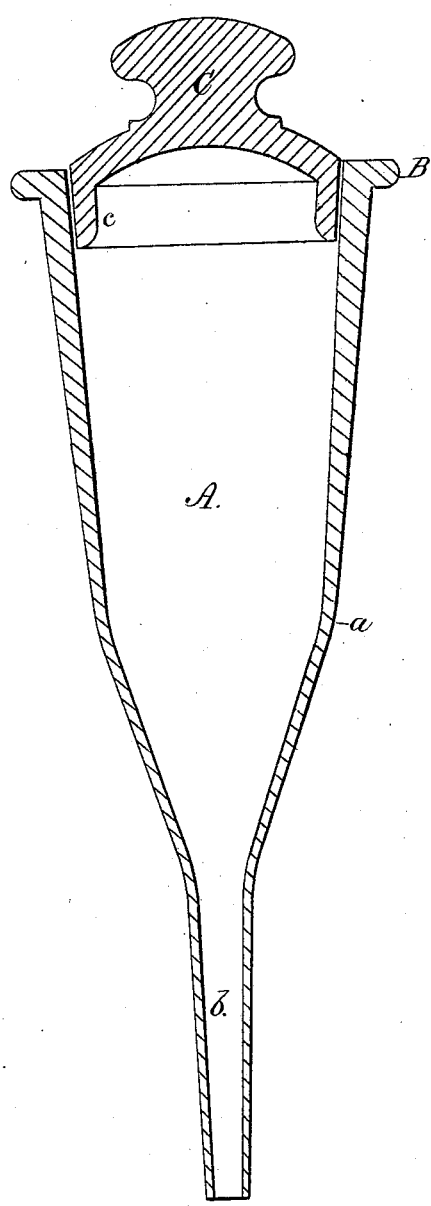
WITNESSES.
INVENTOR.
BY
ATTORNEYS.

UNITED STATES PATENT OFFICE.

LAURENT DURSSE, OF GRAFTON, WEST VIRGINIA.

IMPROVEMENT IN PERCOLATORS.

Specification forming part of Letters Patent No. 150,307, dated April 28, 1874; application filed March 26, 1874.

*To all whom it may concern:*

Be it known that I, LAURENT DURSSE, of Grafton, in the county of Taylor and State of West Virginia, have invented a new and Improved Percolator; and I do hereby declare that the following is a full, clear, and exact description of the same, reference being had to the accompanying drawing, forming a part of this specification, in which the figure is a vertical section.

The invention relates to glass percolators used in the preparation of medicines, wherein the powdered drug is placed with the menstruum or solvent, and the bottom of percolator closed as soon as the liquid has permeated the mass and began to drip. The percolator is then covered and placed in a moderately-warm locality for a few days.

There exists a tendency in the percolators hitherto constructed to admit of too great and rapid an evaporation, thus defeating the exact conditions which are preferred, and allowing much of the strength to be abstracted.

The invention by which I overcome this difficulty will first be fully described in connection with all that is necessary to a full understanding thereof, and then pointed out in the claim.

A represents the body of an ordinary tapering glass percolator, funnel-shaped toward the bottom, and provided with a small projecting pipe or tube, $b$. The walls of the body, from the point $a$ to the top thereof, where it terminates in a ring, B, are of gradually-increasing thickness, to give the necessary strength. C is a glass cover, with pendent edge flange $c$, that fits with perfect accuracy within the top of the body, the opposite contact surfaces of cover and body being correspondingly ground for that purpose. The inner lower edge of the flange $c$ is chamfered, so that condensed vapors will flow readily to and down the sides of the percolator.

By this construction I produce a comparatively air-tight cover, which effectively prevents evaporation while the drug is being digested in the menstruum or solvent.

Having thus described my invention, what I claim as new is—

As an improved article of manufacture, a pharmaceutical percolator having the sides of the body A of gradually-increasing thickness from the point $a$ to the top thereof, and having fitted to its upper end a ground glass cover provided with pendent flange $c$, which is chamfered at its inner bottom edge, as and for the purpose specified.

LAURENT DURSSE.

Witnesses:
CHAS. A. PETTIT,
W. W. HOLLINGSWORTH.